(12) United States Patent
Keiser

(10) Patent No.: US 11,909,721 B2
(45) Date of Patent: Feb. 20, 2024

(54) SYSTEMS AND METHODS FOR AUTOMATED FIREWALL PROVISIONING FOR VIRTUAL MACHINES

(71) Applicant: MASTERCARD INTERNATIONAL INCORPORATED, Purchase, NY (US)

(72) Inventor: Michael Keiser, Weldon Spring, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 376 days.

(21) Appl. No.: 17/137,150

(22) Filed: Dec. 29, 2020

(65) Prior Publication Data

US 2022/0210126 A1 Jun. 30, 2022

(51) Int. Cl.
*H04L 9/40* (2022.01)
*G06F 9/455* (2018.01)

(52) U.S. Cl.
CPC ...... *H04L 63/0263* (2013.01); *G06F 9/45558* (2013.01); *H04L 63/104* (2013.01); *G06F 2009/45587* (2013.01); *G06F 2009/45595* (2013.01)

(58) Field of Classification Search
CPC ............... H04L 63/0263; H04L 63/104; G06F 9/45558; G06F 2009/45587; G06F 2009/45595
See application file for complete search history.

(56) References Cited

U.S. PATENT DOCUMENTS

| | | | |
|---|---|---|---|
| 10,171,425 B2 | 1/2019 | Raney et al. | |
| 10,333,897 B2* | 6/2019 | Arramreddy | ....... H04L 63/0428 |
| 10,341,296 B2 | 7/2019 | Bhagwat et al. | |
| 10,812,451 B2 | 10/2020 | Gunda et al. | |
| 10,848,461 B2 | 11/2020 | Hira et al. | |
| 11,240,203 B1* | 2/2022 | Eyada | ................. H04L 63/0263 |
| 2008/0250407 A1 | 10/2008 | Dadhia et al. | |
| 2013/0125230 A1 | 5/2013 | Koponen et al. | |
| 2014/0130044 A1 | 5/2014 | Zhang et al. | |

(Continued)

FOREIGN PATENT DOCUMENTS

CN 104468568 A 3/2015

*Primary Examiner* — Bruce S Ashley
(74) *Attorney, Agent, or Firm* — Armstrong Teasdale LLP

(57) ABSTRACT

A firewall configuration server includes a processor in communication with a memory device. The processor is configured to: receive, from an admin computer device, group-based firewall rules, wherein the group-based firewall rules identify a plurality of groups of virtual machines (VMs) executable on a VM server system and a respective set of firewall policies to be applied to the VMs in each group; receive, from a virtual machine (VM) server system, group membership data, the group membership data identifying the plurality of groups and a respective list of VMs associated with each group; parse the group membership data according to the group-based firewall rules to generate VM-specific firewall rules; and transmit the VM-specific firewall rules to a firewall, wherein each VM-specific firewall rule is configured for application by the firewall to communication requests identifying an IP address of one of the VMs.

20 Claims, 6 Drawing Sheets

(56) References Cited

U.S. PATENT DOCUMENTS

| | | | |
|---|---|---|---|
| 2015/0237015 A1* | 8/2015 | Bansal | H04L 63/20 |
| | | | 726/13 |
| 2017/0187679 A1* | 6/2017 | Basak | H04L 63/0263 |
| 2019/0253385 A1 | 8/2019 | Gurney | |
| 2020/0007553 A1 | 1/2020 | Zhuk et al. | |
| 2020/0059493 A1 | 2/2020 | Annadata et al. | |
| 2020/0059494 A1 | 2/2020 | Annadata et al. | |

\* cited by examiner

500

502

Receiving, from an admin computer device, group-based firewall rules, wherein the group-based firewall rules identify a plurality of groups of virtual machines (VMs) executable on a VM server system and a respective set of firewall policies to be applied to the VMs in each group, and wherein the group-based firewall rules contain no data that identifies a specific VM

504

Receiving, from a virtual machine (VM) server system, group membership data, the group membership data identifying the plurality of groups and a respective list of VMs associated with each group and currently resident on the VM server system

506

Parsing the group membership data according to the group-based firewall rules to generate VM-specific firewall rules

508

Transmitting the VM-specific firewall rules to a firewall, wherein each VM-specific firewall rule is configured for application by the firewall to communication requests identifying an IP address of one of the VMs

FIG. 5

SYSTEMS AND METHODS FOR AUTOMATED FIREWALL PROVISIONING FOR VIRTUAL MACHINES

BACKGROUND

The present disclosure relates generally to firewall network devices and, more specifically, to managing firewall rules in firewall network devices.

Traditionally, an individual computing device operated under a single operating system. As computing hardware became more powerful, the desire to run multiple operating system instances on a single device, such as a server, motivated the development and implementation of virtual machines, i.e., software constructs that mimic physical hardware in order to run independent operating system instances. Multiple virtual machines (VMs) may be run on a single hardware server, where each VM is allotted a specific portion of the server's processing capacity. VMs may be created, allocated processing capacity, and otherwise managed by a hypervisor software module.

VMs on a local network may be subject to various security policies implemented by a firewall in order to ensure security of the local network against an external network. Typically, firewall rules for components within the local network are based on IP address, and firewall policies cannot be assigned until the VM is deployed and the IP address becomes known. Typically, after for example a new VM is deployed on a server on the local network, labor-intensive human intervention with the firewall is required to assign a firewall policy to the IP address associated with the new VM. The associated delay in assigning firewall policies may delay VM connectivity and cause the local network to operate sub-optimally. Additionally, the possibility of human error in the firewall policy process for each VM, both in assigning the correct firewall policies and specifying the correct VM, may compromise network security and may further delay VM connectivity and network optimization.

Accordingly, a system is needed that (i) automates the implementation of firewall policies for newly created VMs; (ii) allows dynamic updates for the firewall policies assigned to VMs; and (iii) maintains firewall policy integrity across a network when VMs are created or updated.

BRIEF DESCRIPTION

The present embodiments may relate to systems and methods for automated computer code deployment. The system may include a VM server system, a firewall configuration server, a firewall, an admin computer device, a user computing device, and a security database.

In one aspect, a firewall configuration server including at least one processor in communication with at least one memory device is provided. The at least one processor is configured to: (i) receive, from an admin computer device, group-based firewall rules, wherein the group-based firewall rules identify a plurality of groups of virtual machines (VMs) executable on a VM server system and a respective set of firewall policies to be applied to the VMs in each group, and wherein the group-based firewall rules contain no data that identifies a specific VM; (ii) receive, from a virtual machine (VM) server system, group membership data, the group membership data identifying the plurality of groups and a respective list of VMs associated with each group and currently resident on the VM server system; (iii) parse the group membership data according to the group-based firewall rules to generate VM-specific firewall rules; and (iv) transmit the VM-specific firewall rules to a firewall, wherein each VM-specific firewall rule is configured for application by the firewall to communication requests identifying an IP address of one of the VMs.

In another aspect, a computer-implemented method for managing firewall rules is provided. The computer-implemented method is carried out by at least one processor in communication with at least one memory. The method includes: (i) receiving, from an admin computer device, group-based firewall rules, wherein the group-based firewall rules identify a plurality of groups of virtual machines (VMs) executable on a VM server system and a respective set of firewall policies to be applied to the VMs in each group, and wherein the group-based firewall rules contain no data that identifies a specific VM; (ii) receiving, from a virtual machine (VM) server system, group membership data, the group membership data identifying the plurality of groups and a respective list of VMs associated with each group and currently resident on the VM server system; (iii) parsing the group membership data according to the group-based firewall rules to generate VM-specific firewall rules; and (iv) transmitting the VM-specific firewall rules to a firewall, wherein each VM-specific firewall rule is configured for application by the firewall to communication requests identifying an IP address of one of the VMs.

In another aspect, a non-transitory computer-readable storage medium including instructions for managing firewall rules is provided. When executed by at least one processor, the computer-readable storage medium causes the at least on processor to: (i) receive, from an admin computer device, group-based firewall rules, wherein the group-based firewall rules identify a plurality of groups of virtual machines (VMs) executable on a VM server system and a respective set of firewall policies to be applied to the VMs in each group, and wherein the group-based firewall rules contain no data that identifies a specific VM; (ii) receive, from a virtual machine (VM) server system, group membership data, the group membership data identifying the plurality of groups and a respective list of VMs associated with each group and currently resident on the VM server system; (iii) parse the group membership data according to the group-based firewall rules to generate VM-specific firewall rules; and (iv) transmit the VM-specific firewall rules to a firewall, wherein each VM-specific firewall rule is configured for application by the firewall to communication requests identifying an IP address of one of the VMs.

BRIEF DESCRIPTION OF THE DRAWINGS

FIGS. 1-6 show example embodiments, of the methods and systems described herein.

FIG. 1 illustrates a block diagram of a firewall automation ("FA") computer system including a firewall configuration server and a VM server system.

FIG. 2 illustrates a data flow within the FA computer system of FIG. 1.

FIG. 3 illustrates a schematic diagram of an example user computing device, such as a user computing device or admin computer device that may be included in the FA computing system of FIG. 1.

FIG. 4 illustrates a schematic diagram of a server computing device, such as the firewall configuration server or VM server system of FIG. 1.

FIG. 5 illustrates a flow chart of a method for managing firewall rules using a firewall configuration server, such as the firewall configuration server of FIG. 1.

FIG. 6 illustrates a diagram of a computer device and internal components, such as those that may be found in the firewall configuration server of FIG. 1.

DETAILED DESCRIPTION OF THE DISCLOSURE

Figure 1:
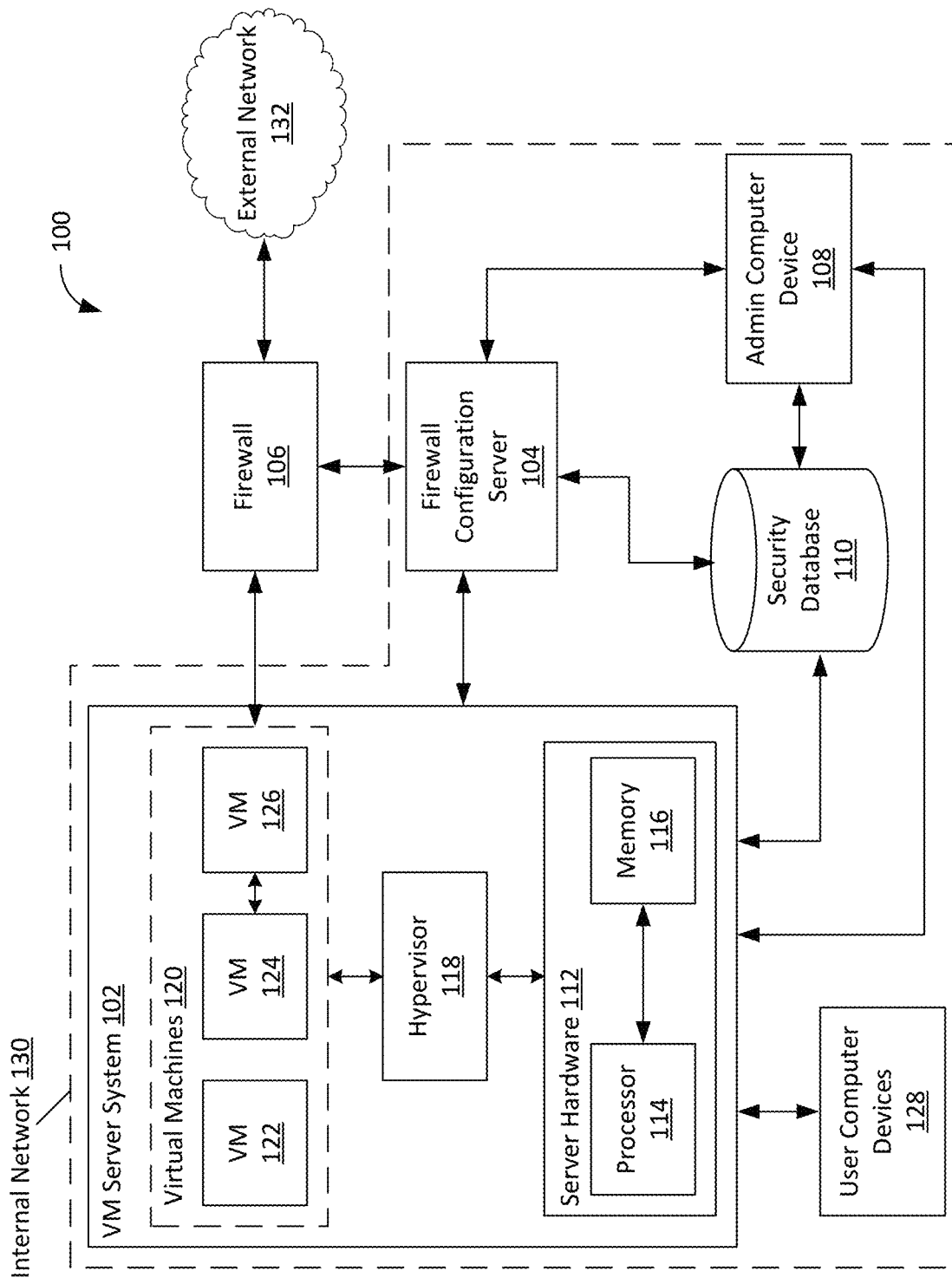

Embodiments of the present disclosure relate generally to management of firewall policies for virtual machines (VMs). More particularly, the present disclosure relates to a computer system, referred to herein as a firewall automation ("FA") system, that enables the automated application of firewall policies to each VM in near-real-time as the VM is built, using metadata "tags" applied to the VMs during build and separately definable groups of tags.

The systems and methods described herein are implemented using the FA computer system, which in an example includes a VM server system, a firewall configuration server, and a firewall. The VM server system is any physical server system running multiple VMs. The firewall configuration server and firewall may be commercial, off-the-shelf (COTS) units which are configured to apply user-defined firewall policies to VMs. The firewall is a security system (hardware or software) that manages requests for network connectivity, particularly between components of the VM server system and any external network.

The VMs are identified to the firewall configuration server using tag structures implemented on the VM server. More specifically, tags defined by the tag structures are assigned to each VM at build, and the tags are dynamically assigned to groups. Firewall policies for each of the groups are maintained at the firewall configuration server. The firewall configuration server automatically receives group membership data from the VM server at regular intervals, for example every 30 seconds. Accordingly, as a new VM comes online, the built-in tag is immediately recognized at the VM server as part of one or more groups, the firewall configuration server is apprised of the updated group membership in near-real-time, and the firewall policies already in place for the group are immediately applied to the IP address corresponding to the new VM. Using the FA computer system, there is no need for VM developers to wait for the IP address of a new VM to become known, and then ask Information Technology (IT) personnel to manually redefine groups and/or separately configure a firewall policy based on a provided IP address each time a new VM is added at the VM server.

In some examples, a user, for example at an admin computing device, defines a tag structure, a group structure, and rules for group membership based on the tags. The tag structure definition, group structure definition, and membership rules are uploaded to the VM server. The admin computer device may be any computing device, such as a desktop, laptop, or mobile device, that enables user interaction with a hypervisor and/or firewall configuration server.

The user also transmits firewall policies associated with each group (i.e., "group-based policies") to the firewall configuration server. The VM server system assigns the appropriate tag to each VM, and then auto-populates the defined groups based on the membership rules. The firewall configuration server receives group membership data regularly from the VM server system. For example, current group membership data is received at intervals that do not exceed one minute. For example, the firewall configuration server polls the VM server system every 30 seconds. Alternatively, the VM server system automatically pushes the group membership data to the firewall configuration server at the regular intervals. Based on the received group membership data, the firewall configuration server associates the group-based firewall policies to each individual VM to create VM-specific policies, and pushes the VM-specific policies to the firewall. The firewall then manages connection requests and packet inspection for each individual VM, allowing or preventing network traffic according to the VM-specific firewall policies.

In the example embodiment, the tag structure definition is a metadata field that is included in each VM via a hypervisor module executing on the VM server system. For example, tags used in the metadata field may include "Low-security", "High-security", "Web", or "Application". The VM server system is configured to apply tags to VMs at build via the hypervisor, such that each VM is labeled with a tag. The hypervisor is any suitable virtual machine manager that enables multiple VMs to share a single hardware platform. For example, the hypervisor parcels out running time on the underlying hardware of the VM server system to the operating systems of each VM.

In some examples, the tag metadata field is the name of the VM. For example, any VM with the term "Mail" in its name is recognized as having the tag "Mail." Alternatively, the tag is a separate, dedicated metadata field. In some examples, multiple security tags may be applied to a single VM. For example, a VM may be labeled with a security tag of "High-security", or a VM may be labeled with a security tag of "Medium-security" and "Application".

In the example embodiment, the group structure definition is a data structure that associates a group name to a list of VMs having a specific tag, and the group membership rules associate each group with one or more specific tags. For example, a user at the admin computer device uploads the group structure definition and the group membership rules to the hypervisor. The group structure definition may include fields for a list of VMs (e.g., IP addresses corresponding to each VM 120, or alternatively unique VM identifiers assigned by hypervisor 118) assigned to each group, for example. The VM server system is configured to add each new VM to the corresponding group by applying the group membership rules to the tag of the VM. In some examples, the names of the groups correspond to the values of the tags. For example, a "High-security" group may be populated by VMs which have been tagged as "High-security". Alternatively, the names of the groups are unrelated to the tag values. In the example embodiment, the VM server system is configured to automatically retrieve the value from the tag metadata field for each VM on the VM server system at regular intervals to generate the group membership data based on the tags. In some embodiments, the group membership data is updated at a regular, relatively frequent interval (e.g., near real-time, such as every 30 seconds). Accordingly, if a VM is added or removed at the VM server system, the group membership data generated by the VM server system at the next interval reflects the change.

In the example embodiment, the VM server system transmits group membership data to the firewall configuration server on a periodic basis. In some such embodiments, the period does not exceed one minute. For example, the firewall configuration server is configured to poll the VM server system for the group membership data every 30 seconds. The group membership data includes information that links each VM to its associated group. In other words, after a VM is tagged during build of the VM by the hypervisor, the VM server system adds the VM to a group according to the group membership rules, and information about the new VM, along with any existing VMs, is included in the next set of group membership data transmitted to the firewall configuration server. In the example embodiment, VMs are each identified by a respective IP address assigned to the VM at build. For example, the VM server system may transmit group member ship data as a table including 3 groups, "High-security", "Low-security", and "Medium-security", with a respective list of IP addresses associated with each group.

In the example embodiment, the firewall configuration server is configured to receive group-based firewall rules. In some examples, the firewall configuration server receives the group-based rules from a user at the admin computer device. The group-based firewall rules include firewall policies (i.e., permissions, security rules, etc.) associated with each group. For example, the security groups may include "High-security" and "Low-security", and a set of group-based rules may include one set of rules specific to the High-security group and another set of rules specific to the Low-security group. The rules for the High-security group may include relatively strict policies for connections to an external network by any VM in the High-security group, and the rules for the Low-security group may include relatively lax policies for connections to the external network by any VM in the Low-security group.

In the example embodiment, the firewall configuration server is configured to parse the group membership data according to the group-based rules in order to determine VM-specific firewall rules. In other words, based on the group-based rules (firewall rules assigned to each group) and the group membership data (which VMs belong to each group), the firewall configuration server determines which firewall rules are assigned to each VM. In the example embodiment, VMs in each group are identified by their assigned IP addresses, and the VM-specific firewall rules are rules applicable to specific IP addresses. For example, a group-based rule may allow only designated traffic to the "High-security" group, and group membership data may include a list of IP addresses of VMs that belong to the High-security group. The firewall configuration server, then, generates IP-based rules that allow only the designated traffic to each IP address in the High-security group.

The firewall configuration server is configured to transmit the VM-specific (e.g., IP-address-specific) rules to the firewall so that the firewall is able to manage traffic into and out of VMs within the FA system. The firewall is responsible for managing network traffic based on the rules, and in the example embodiment, manages network traffic based on rules for specific IP addresses. Accordingly, the firewall is the intermediary between the VMs and an external network, such as the Internet, and connectivity between the VMs and the external network is managed by the firewall based on the IP-based rules applied by the firewall. In some examples, the firewall may access a list of IP-based rules includes a set of traffic permissions associated with a list of IP addresses. A VM with a specific IP address may send a request to access a network external to the firewall and the firewall may compare the IP address of the VM to the IP-based rules and determine whether or not the VM is allowed to access the external network. Likewise, a network external to the firewall may send a request to access a specific IP address associated with the VM and the firewall may compare the IP address of the VM to the IP-based rules and determine whether or not the external network is allowed to access the VM.

The resulting technical benefits achieved by the methods and systems described herein include at least one of: (a) reducing downtime within a computer network due to bottlenecks inherent in manual processes for managing firewall rules; (b) increasing reliability of firewall rules application within a computer network by limiting the introduction of human error; (c) increasing computer network security by reducing reliance on external inputs for managing firewall rules; (d) eliminating the need for additional virtual machines ("VMs") required specifically for managing communications between the VM server system and a firewall configuration server, thereby reducing network load and load managed by the VM server system.

The systems and methods of the disclosure are implemented using computer programming or engineering techniques including computer software, firmware, hardware, or any combination or subset thereof, wherein the technical effects are achieved by: (i) receiving, from an admin computer device, group-based firewall rules, wherein the group-based firewall rules identify a plurality of groups of virtual machines (VMs) executable on a VM server system and a respective set of firewall policies to be applied to the VMs in each group, and wherein the group-based firewall rules contain no data that identifies a specific VM; (ii) receiving, from a virtual machine (VM) server system, group membership data, the group membership data identifying the plurality of groups and a respective list of VMs associated with each group and currently resident on the VM server system; (iii) parsing the group membership data according to the group-based firewall rules to generate VM-specific firewall rules; and (iv) transmitting the VM-specific firewall rules to a firewall, wherein each VM-specific firewall rule is configured for application by the firewall to communication requests identifying an IP address of one of the VMs.

Any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In some embodiments, at least one computing device is being run in a Windows® environment (Windows is a registered trademark of Microsoft Corporation, Redmond, Washington). Additionally or alternatively, at least one computing device is run on a mainframe environment and a UNIX® server environment (UNIX is a registered trademark of X/Open Company Limited located in Reading, Berkshire, United Kingdom). The system is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to firewall configuration in a variety of applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 2:
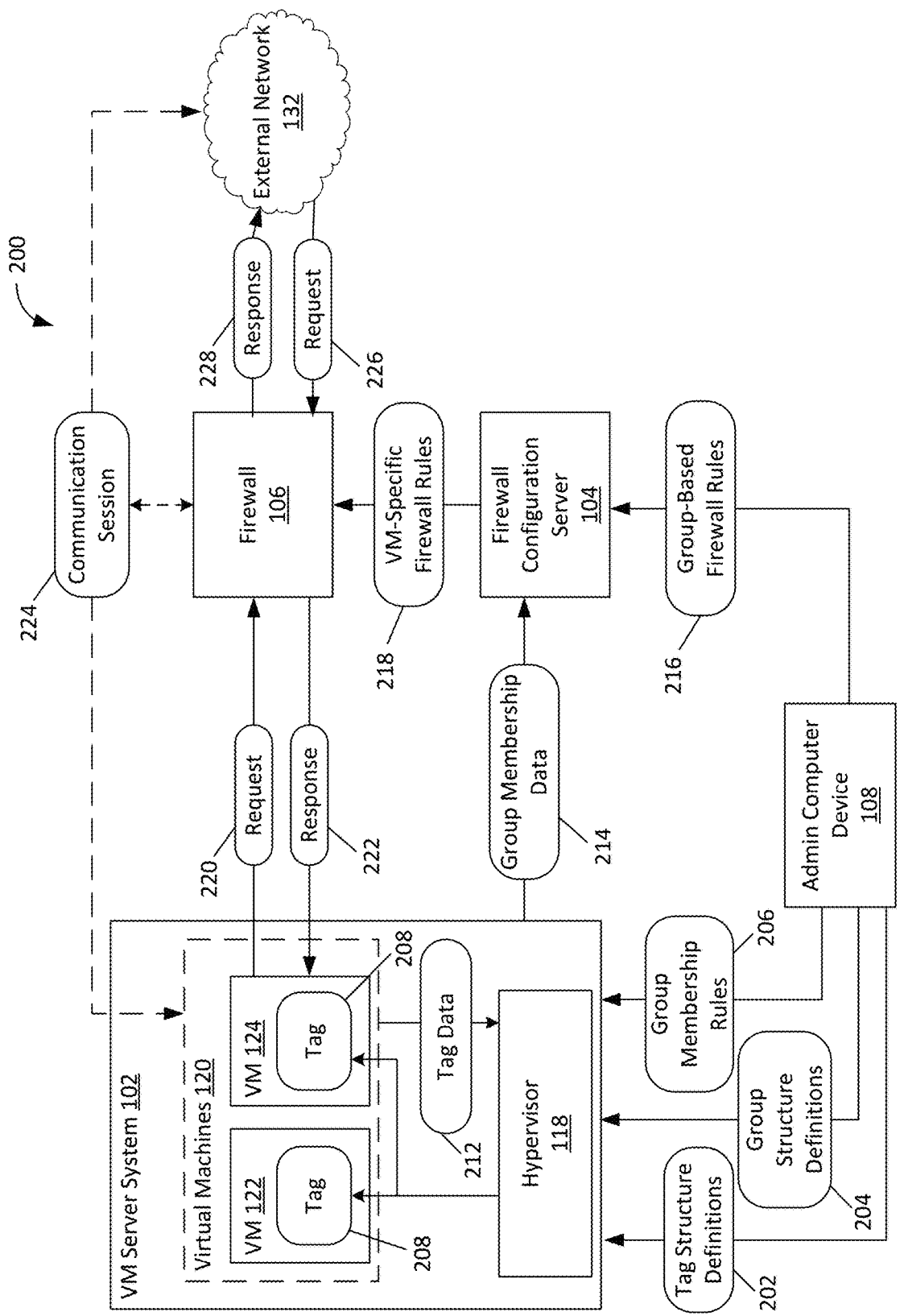

FIG. 1 illustrates an example firewall automation ("FA") computing system 100. FIG. 2 illustrates a data flow 200 through FA system 100. FA computing system 100 includes virtual machine ("VM") server system 102, firewall configuration server 104, and firewall 106. In the example, FA computing system 100 also includes an admin computer device 108, a security database 110, and/or additional user computer devices 128, each of which may be communicably coupled to VM server system 102 and/or firewall configuration server 104. VM server system 102 is a server management computer device that enables virtualization on server hardware 112, which includes at least one processor 114 in communication with a memory 116. VM server system 102 further includes hypervisor 118, which is a virtualization layer implemented on server hardware 112. More specifically, hypervisor 118 is a software module that manages a plurality of VMs 120 executable on server hardware 112, which in the example includes VMs 122, 124, and 126. Accordingly, actions, communication, processing, etc., related to hypervisor 118 are physically implemented by or directed toward the server hardware 112, with hypervisor 118 accessing and utilizing server hardware 112 in order to implement actions, receive communications, etc.

VM server system 102, and components therein, such as VMs 120, are in communication with firewall 106. In addition, hypervisor 118 is in communication with firewall configuration server 104. Admin computer device 108 and security database 110 are in communication with VM server system 102 and firewall configuration server 104. VM server system 102, firewall configuration server 104, admin computer device 108, security database 110, and user computer devices 128 are communicably linked via at least one internal network 130. Firewall 106 is configured to control access by the components of the at least one internal network 130 to an external network 132, such as the Internet. In alternative embodiments, one or more components of FA system 100 are connected directly to firewall 106 (e.g., a port-to-port connection with firewall 106).

Hypervisor 118 manages the creation of VMs 120, as well as the amount of processing capacity of the at least one processor 114 and the amount of memory 116 allotted to each VM 120, among other tasks. VMs 120 are virtual machines that include independent operating systems and access the processing power of server hardware 112 via the virtualization layer. In some embodiments, one or more of VMs 120 may be run on user computer devices 128. VMs 120 may be in communication with each other, as illustrated by VMs 124 and 126, or may be completely independent from each other, as illustrated by VM 122.

In the example embodiment, VM server system 102 is further configured to assign tags 208 to VMs 120 and create group membership data 214 based on the tags. Specifically, VM server system 102 is configured to apply tags 208 to VMs 120 and track group membership based on the tags. For example, hypervisor 118 may add a "high-security" tag 208 to VM 122, and based on the tag, add VM 122 to a "high-security" group in group membership data 214.

In the example embodiment, VM server system 102 is in communication with admin computer device 108. Admin computer device 108 may be any computing device, such as a desktop, laptop, or mobile device, that enables user interaction with VM server system 102 and/or firewall configuration server 104. Admin computer device 108 may be configured to receive user input and interact with VM server system 102 and/or firewall configuration server 104. For example, admin computer device 108 may be used to manage administrative settings of VM server system 102 and/or firewall configuration server 104. In some embodiments, hypervisor 118 is implemented using VMWare NSX-v, firewall 106 is implemented as a CheckPoint physical firewall, and firewall configuration server 104 is implemented using CheckPoint Smart Console. Alternatively, each of hypervisor 118, firewall 106, and firewall configuration server 104 is implemented in any suitable fashion.

In the example embodiment, VM server system 102 may receive instructions from admin computer device 108 that cause hypervisor 118 to generate new VMs 120, remove previously executing VMs 120, and/or manage processing power allotted to one or more VMs 120. Additionally or alternatively, hypervisor 118 receives such instructions from one or more of user devices 128. In the example embodiment, admin computer device 108 is further configured to transmit tag structure definitions 202 to VM server system 102. Tag structure definitions 202 are used by VM server system 102 to apply tags 208 to VMs 120. More specifically, tag structure definitions 202 cause hypervisor 118, during a server build process for each VM 120, to identify or create a metadata field of VM 120 and apply a value for the tag 208. The value may indicate a security level associated with the VM 120, such as "high-security" or "low-security", or may be descriptive of a function of VM 120, such as "web", "application", "mail," or "database." In some embodiments, tag structure definitions 202 may be selected by a user of admin computer device 108 from predefined choices or templates in an off-the-shelf software interface provided with hypervisor 118 and executable on admin computer device 108. Additionally or alternatively, tag structure definitions 202 may be defined and/or customized by a user of admin computer device 108.

In the example embodiment, admin computer device 108 is further configured to transmit group structure definitions 204 to VM server system 102. Group structure definitions 204 are a plurality of data structures or a single data structure, such as a table, a database, or some other digital container, that enables associating VMs 120 and/or other components of VM server system 102 with one or more security group identifiers. In the example embodiment, group structure definitions 204 associate VMs 120 based on a security level of each VM of VMs 120. In some embodiments, group structure definitions 204 may be selected by a user of admin computer device 108 from predefined choices or templates in an off-the-shelf software interface provided with hypervisor 118 and executable on admin computer device 108. Additionally or alternatively, group structure definitions 204 may be defined and/or customized by a user of admin computer device 108.

In the example embodiment, admin computer device 108 is further configured to transmit group membership rules 206 to VM server system 102. Group membership rules 206 are rules that govern how components of VM server system 102 are assigned to security groups. In other words, group membership rules 206 define assignment of each VM 120 to a security group based on the tag 208 assigned to the VM 120. In some embodiments, security groups and security tags have the same or similar naming conventions. For example, group membership rules 206 may instruct hypervisor 118 to place any VMs 120 having a "high-security" tag into a "high-security" security group. Likewise, group membership rules 206 may instruct hypervisor 118 to place any VMs 120 having an "application" tag into an "application" security group. In other embodiments, the names of the groups and the names of the tags are unrelated. In some embodiments, group membership rules 206 include if-then rules, such as "if a VM includes 'high-security' tag, place the VM in the 'high-security' group." Additionally or alternatively, security group membership rules 206 include universal rules, such as "place all VMs with a 'mail' in the name into the 'mail' group." Updates to group membership rules 206 transmitted to VM server system 102 do not alter the tags 208 assigned to the VMs 120, enabling dynamic reassignment of VMs 120 to new and/or different groups without disrupting any aspect of operation of VMs 120.

In the example embodiment, VM server system 102 is configured to automatically retrieve the tag 208 from the tag metadata field for each VM 120 that is currently running, or is at least sufficiently advanced in the build process to have received tag 208, and apply group structure definitions 204 and group membership rules 206 to generate group membership data 214. Group membership data 214 identifies a plurality of groups and a respective list of VMs 120 currently resident on VM server system 102 and associated with each of the groups. For example, based on group structure definitions 204, group membership data 214 may include a plurality of group identifiers (e.g., the names assigned to each group), each group identifier being followed by a list of the IP addresses of each VM 120 assigned to the corresponding group. In some embodiments, the tags 208 are retrieved and the group membership data 214 is updated, for example by hypervisor 118, at a regular, relatively frequent interval. In some such embodiments, the interval does not exceed one minute (e.g., near real-time, such as every 30 seconds). Accordingly, if a VM 120 is added or removed at the VM server system 102, the group membership data 214 generated by the hypervisor 118 reflects the change in near real-time.

In certain embodiments, in addition to or as an alternative to admin computer device 108 being in direct communication with VM server system 102 and/or firewall configuration server 104, VM server system 102 is configured to receive one or more of tag structure definitions 202, group structure definitions 204, and group membership rules 206 indirectly. For example, admin computer device 108 is configured to store one or more of tag structure definitions 202, group structure definitions 204, and group membership rules 206 in security database 110, and hypervisor 118 is likewise configured to retrieve one or more of tag structure definitions 202, group structure definitions 204, and group membership rules 206 from security database 110 on a periodic basis, or as needed when building one of VMs 120 or compiling group membership data 214.

In the example embodiment, VM server system 102 is configured to transmit group membership data 214 to firewall configuration server 104. In the example embodiment, each VM 120 is identified within group membership data 214 by at least an IP address assigned to the VM 120. Additionally or alternatively, VMs 120 are identified by other data, such as a unique ID assigned by hypervisor 118 to each VM 120, or some other information associated with the VM 120 that may be parsed by firewall configuration server 104 to determine the IP address of the VM 120. For example, group membership data 214 may be a data structure that identifies two groups, "high-security" and "low-security", and each group identifier is followed by a respective list of IP addresses corresponding to the VMs 120 that belong to the group.

In the example embodiment, VM server system 102 transmits group membership data 214 to firewall configuration server 104 on a periodic basis. For example, firewall configuration server 104 is configured to poll VM server system 102 for group membership data 214 on a near real-time basis, such as every 30 seconds. Accordingly, if a VM 120 is added or removed at the VM server system 102, not only does the group membership data 214 generated by the hypervisor 118 reflect the change in near real-time, but the change is also transmitted to firewall configuration server 104 in near real-time. In other words, a time lapse between the assignment of tag 208 during build of a new VM 120, and the recognition of the new VM in a group by firewall configuration server 104, does not exceed 60 seconds. In most cases, firewall configuration server 104 is aware of the new VM 120 before build of the new VM 120 is completed.

In certain embodiments, in addition to or as an alternative to firewall configuration server 104 being in direct communication with VM server system 102, VM server system 102 is configured to receive group membership data 214 indirectly. For example, VM server system 102 is configured to store group membership data 214 in security database 110, and firewall configuration server 104 is likewise configured to retrieve group membership data 214 from security database 110 on a periodic basis, such as every 30 seconds.

In some embodiments, firewall configuration server 104 is implemented using a commercial off-the-shelf (COTS) software package for firewall 106, and the COTS package is designed to require its own VM to be added to VM server system 102 that intercepts all network traffic into and out of VM server system 102. Likewise, hypervisor 118 is implemented using a COTS software package that is designed to execute its own additional controllers that make available, for example group information to an interface with the overlay network established by the intercept VM. This default COTS arrangement is complex, expensive, and difficult to manage. In contrast, certain embodiments described in the present disclosure include programming the firewall configuration server 104 to include at least one module, not included in the COTS package, that polls hypervisor 118 directly for group membership data 214, thereby eliminating the need to install and/or execute the additional intercept VM, overlay network, and controllers associated with the COTS packages and reducing complexity and expense of FA computing system 100. Alternatively, firewall configuration server 104 and/or hypervisor 118 are implemented in any suitable fashion that enables FA computing system 100 to operate as described herein.

In the example embodiment, firewall configuration server 104 is in communication with firewall 106. Firewall 106 is a security system (hardware or software) that manages requests for network connectivity and implements network security policies, particularly between components of internal network 130 and external network 132. Firewall configuration server 104 is configured to manage the settings, policies, instructions, etc. that are implemented by firewall 106. In some embodiments, admin computer device 108 sends instructions to firewall configuration server 104 including new or updated firewall policies, including group-based firewall rules 216, and firewall configuration server 104 transmits the policies to firewall 106 in a format that can be implemented by firewall 106. Firewall 106 is configured to utilize the received firewall policies to manage network access to/from VMs 120. In other words, VMs 120 may attempt to connect to external network 132 (or vice versa), and firewall 106 determines whether or not each requested connection to VMs 120 is allowed based on the firewall policies.

In the example embodiment, admin computer device 108 is further configured to communicate with firewall configuration server 104. For example, admin computer device 108 is configured to provide instructions, settings, policies, etc. to firewall configuration server 104. In particular, admin computer device 108 is configured to transmit group-based firewall rules 216 to firewall configuration server 104. Group-based firewall rules 216 identify a plurality of groups that may be established on VM server system 102, and a respective set of firewall policies (i.e., permissions, security rules, etc.) to be applied to the VMs 120 in each group. For example, a user of admin computer device 108 selects the firewall policies for each group. For example, firewall configuration server 104 may receive instructions that all VMs in the "high-security" group are allowed to connect only with specified locations on external network 132 via firewall 106, whereas all VMs in the "low-security" group are allowed to connect with a broad range of locations on external network 132 via firewall 106. Similarly, group-based firewall rules 216 for a "web" group may enable requests 226 from external network 132 for access to a specified web server to reach included VMs 120. In the example embodiment, group-based firewall rules 216 contain no data that identifies a specific VM 120. In other words, group-based firewall rules 216 transmitted by admin computer device 108 contain no references or links to the IP addresses or other unique identifiers of the VMs 120 that may be part of the group. Instead, the identities of specific VMs 120 in each group are dynamically received by firewall configuration server 104 from VM server system 102 on a periodic basis after firewall configuration server 104 receives group-based firewall rules 216.

Firewall configuration server 104 is configured to parse group membership data 214 generated by hypervisor 118 according to group-based firewall rules 216 received from admin computer device 108 to generate VM-specific firewall rules 218. In other words, by applying group-based firewall rules 216 to group membership data 214, firewall configuration server 104 generates VM-specific firewall rules 218 and transmits VM-specific firewall rules 218 to firewall 106. Each VM-specific firewall rule 218 is configured for application by the firewall 106 to communication requests identifying an IP address of one of the VMs 120. For example, firewall 106 receives a request 220 from the IP address associated with one of VMs 120 to access external network 132 and, based on the VM-specific firewall rules 218, generates and transmits a response 222 to the one of VMs 120. If request 220 is granted (e.g., the VM 120 has adequate permissions according to VM-specific firewall rules 218), firewall 106 establishes a communication session 224 between the IP address of the VM 120 and external network 132. Alternatively, firewall 106 establishes communication session 224 between the IP address of the VM 120 and external network 132 after receiving a request 226 from external network 132 and sending a response 228.

In the example embodiment, the firewall configuration server 104 is configured to transmit VM-specific firewall rules 218 to firewall 106 automatically in response to generation of VM-specific firewall rules 218 from the received group membership data 214. For example, firewall configuration server 104 re-generates VM-specific firewall rules 218 in response to each receipt of group membership data 214 on a periodic basis from hypervisor 118, and transmits the re-generated VM-specific firewall rules 218 to firewall 106 automatically in response to each regeneration of the VM-specific firewall rules 218. In some examples, VM-specific firewall rules 218 are transmitted to firewall 106 at intervals that do not exceed one minute. For example, the firewall configuration server 104 transmits VM-specific firewall rules 218 to firewall 106 every 30 seconds in response to the receipt of group membership data 214 every 30 seconds.

In the example embodiment, as discussed above, the VM-specific firewall rules 218 are implemented as IP-address-specific firewall rules, i.e., each VM 120 is represented as a corresponding IP address assigned to VM 120 at build, and VM-specific firewall rules 218 include rules to apply to requests to and/or from each IP address. Accordingly, firewall 106 applies VM-specific firewall rules 218 directly to requests 220 from an IP address associated with a particular VM 120 and/or requests 226 addressed to an IP address associated with a particular VM 120. For example, group membership data 214 may include a "medium-security" group, listing IP Address 1 (associated with VM 122) and IP Address 2 (associated with VM 124) as members of the "medium-security" group. Group-based firewall rules 216 may include a rule that indicates components in the "medium-security" group are allowed to access only designated locations on external network 132. Applying group-based firewall rules 216 to group membership data 214, firewall configuration server 104 generates VM-specific firewall rules 218 allowing IP Address 1 and IP Address 2 to access only the designated locations on external network 132. Alternatively, VM-specific firewall rules 218 are associated with specific VMs 120 in any suitable fashion that enables FA computing system 100 to function as described herein.

In certain embodiments, in addition to or as an alternative to firewall configuration server 104 being in direct communication with admin computer device 108, firewall configuration server 104 is configured to receive group membership data 214 indirectly. For example, admin computer device 108 is configured to store group-based firewall rules 216 in security database 110, and firewall configuration server 104 is likewise configured to retrieve group-based firewall rules 216 from security database 110 on a periodic basis, such as every 30 seconds.

In the example embodiment, firewall configuration server 104 is configured to re-generate VM-specific firewall rules 218 in response to every receipt of group membership data 214 generated by VM server system 102. Moreover, because group-based firewall rules 216 already define the firewall policies to be applied to all VMs 120 in each group, firewall configuration server 104 immediately and automatically implements VM-specific firewall rules 218 for any new VM 120 as soon as the new VM 120 appears in group membership data 214 received by firewall configuration server 104, which in some examples is within 60 seconds from assignment of tag 208 and/or occurs before build of the new VM 120 is completed, as discussed above. Accordingly, new VMs 120 may be brought online at VM server system 102 with no delays or extra manual procedures required for implementing a firewall policy for the new VM.

In the exemplary embodiment, security database 110 may contain any data required for carrying out the methods implemented by FA system 100, such as tag structure definitions 202, group structure definitions 204, group membership rules 206, group membership data 214, group-based firewall rules 216, and VM-specific firewall rules 218. The security database is further configured to store data from external sources for use by components of FA system 100 and/or to store data generated or sent by any components of FA system 100.

Figure 3:
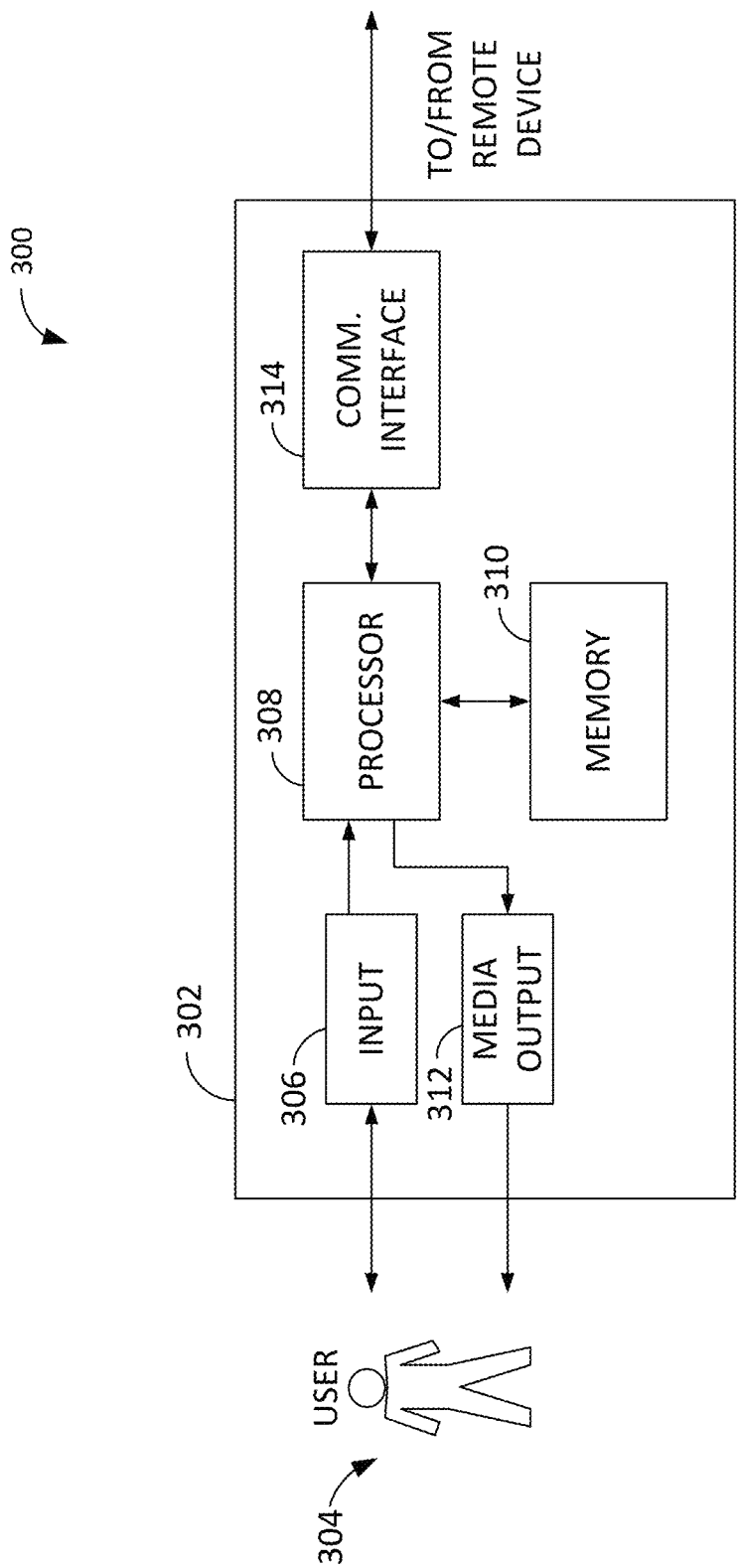

FIG. 3 illustrates an example configuration 300 of an example user computing device 302 that may be a component of admin computer device 108 and/or one of user computing devices 128 (shown in FIG. 1). In some embodiments, user computing device 302 is in communication with a firewall configuration server, such as firewall configuration server 104, and/or a virtual machine ("VM") server system, such as VM server system 102 (shown in FIG. 1). For example, user computing device 302 may be a smartphone, tablet, smartwatch, wearable electronic, laptop, desktop, vehicle computing device, or another type of computing device associated with the account holder.

User computing device 302 may be operated by a user 304 (e.g., a user of FA server 100, shown in FIG. 1). User computing device 302 may receive input from user 304 via an input device 306. User computing device 302 includes a processor 308 for executing instructions. In some embodiments, executable instructions may be stored in a memory area 310. Processor 308 may include one or more processing units (e.g., in a multi-core configuration). Memory area 310 may be any device allowing information such as executable instructions and/or transaction data to be stored and retrieved. Memory area 310 may include one or more computer-readable media.

User computing device 302 also may include at least one media output component 312 for presenting information to user 304. Media output component 312 may be any component capable of conveying information to user 304. In some embodiments, media output component 312 may include an output adapter (not shown), such as a video adapter and/or an audio adapter. An output adapter may be operatively coupled to processor 308 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones). In some embodiments, media output component 312 may be configured to present a graphical user interface (e.g., a web browser and/or a client application) to user 304.

In some embodiments, user computing device 302 may include input device 306 for receiving input from user 304. User 304 may use input device 306 to, without limitation, interact with FA computing system 100 (e.g., using an app), firewall configuration server 104, or any of VM server system 102, security database 110, and firewall 106 (shown in FIG. 1). Input device 306 may include, for example, a keyboard, a pointing device, a mouse, a stylus, and/or a touch sensitive panel (e.g., a touch pad or a touch screen). A single component, such as a touch screen, may function as both an output device of media output component 312 and input device 306. User computing device 302 may further include at least one sensor, including, for example, an audio input device, a video input device, a gyroscope, an accelerometer, a position detector, a biometric input device, and/or a telematics data collection device. In some embodiments, at least some data collected by user computing device 302 may be transmitted to firewall configuration server 104.

User computing device 302 may also include a communication interface 314, communicatively coupled to any of VM server system 102, firewall configuration server 104, firewall 106, and security database 110. Communication interface 314 may include, for example, a wired or wireless network adapter and/or a wireless data transceiver for use with a mobile telecommunications network.

Stored in memory area 310 may be, for example, computer-readable instructions for providing a user interface to user 304 via media output component 312 and, optionally, receiving and processing input from input device 306. The user interface may include, among other possibilities, a web browser and/or a client application. Web browsers enable users, such as user 304, to display and interact with media and other information typically embedded on a web page or a website hosted by any components of FA system 100 and/or user computing device 302. A client application may allow user 304 to interact with, for example, any of VM server system 102, firewall configuration server 104, firewall 106, and security database 110. For example, instructions may be stored by a cloud service and the output of the execution of the instructions sent to the media output component 312.

Figure 4:
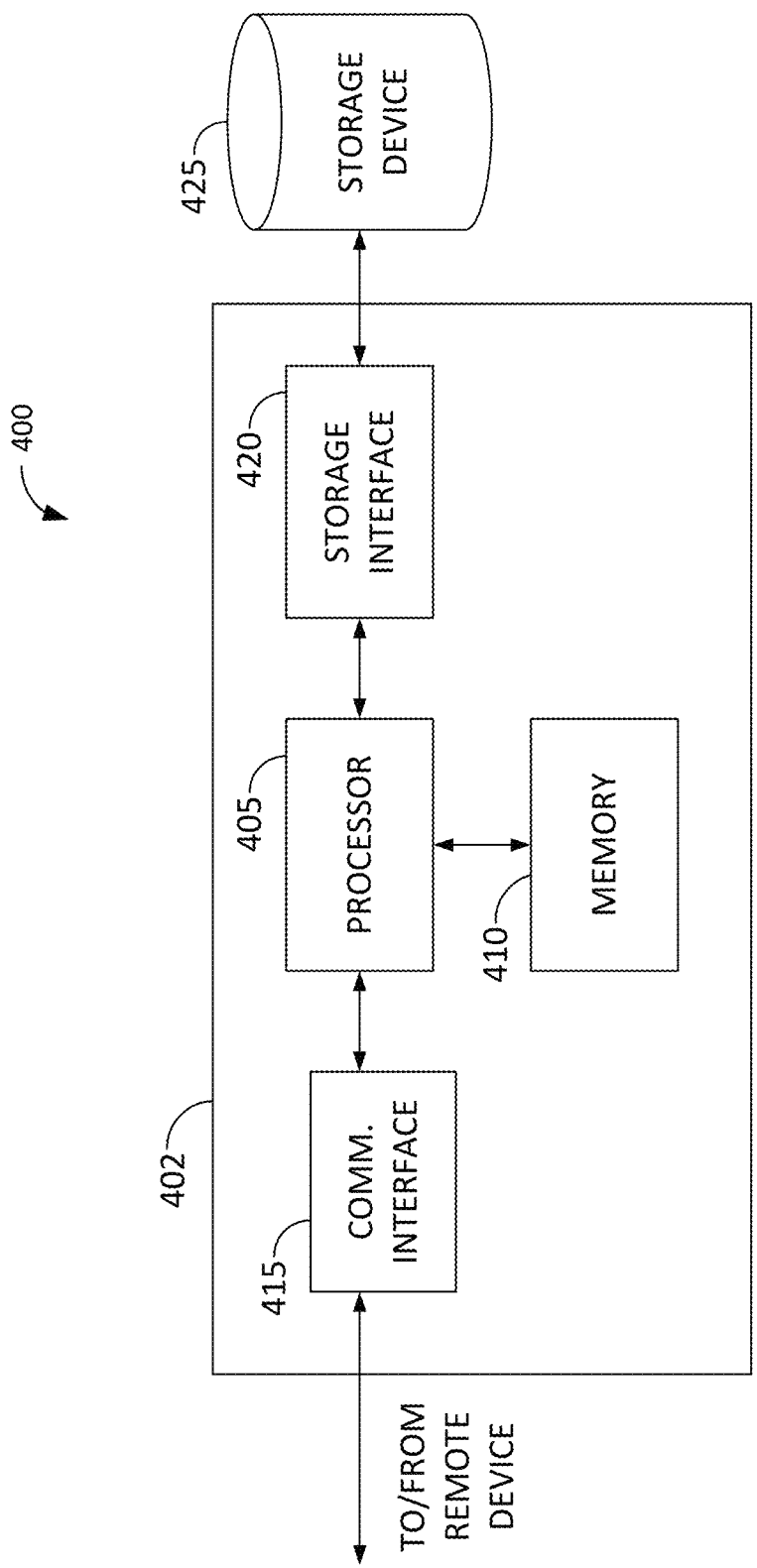

FIG. 4 depicts an example configuration 400 of an example server computing device 402 that may be used to implement VM server system 102 and/or firewall configuration server 104 (shown in FIG. 1). Server computer device 402 may include a processor 405 for executing instructions. Instructions may be stored in a memory area 410. Processor 405 may include one or more processing units (e.g., in a multi-core configuration).

Processor 405 may be operatively coupled to a communication interface 415 such that server computer device 402 may be capable of communicating with a remote device such as another server computer device 402 or a user computing device, such as user computing device 302 (shown in FIG. 3). For example, communication interface 415 may receive requests from or transmit requests to user computing device 302 via the Internet.

Processor 405 may also be operatively coupled to a storage device 425. Storage device 425 may be any computer-operated hardware suitable for storing and/or retrieving data, such as, but not limited to, data associated with security database 110 (shown in FIG. 1). In some embodiments, storage device 425 may be integrated in server computer device 402. For example, server computer device 402 may include one or more hard disk drives as storage device 425. In other embodiments, storage device 425 may be external to server computer device 402 and may be accessed by a plurality of server computer devices 402. For example, storage device 425 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Processor 405 executes computer-executable instructions for implementing aspects of the disclosure. In some embodiments, processor 405 may be transformed into a special purpose microprocessor by executing computer-executable instructions or by otherwise being programmed.

FIG. 5 depicts a flow chart illustrating a computer-implemented method 500 for managing firewall rules. In the example embodiment, method 500 may be implemented by a firewall configuration server, such as firewall configuration server 104 (shown in FIG. 1).

Method 500 may include receiving 502, from an admin computer device, group-based firewall rules, wherein the group-based firewall rules identify a plurality of groups of virtual machines (VMs) executable on a VM server system and a respective set of firewall policies to be applied to the VMs in each group, and wherein the group-based firewall rules contain no data that identifies a specific VM. Method 500 may include receiving 504, from a virtual machine (VM) server system, group membership data, the group membership data identifying the plurality of groups and a respective list of VMs associated with each group and currently resident on the VM server system. Method 500 may further include parsing 506 the group membership data according to the group-based firewall rules to generate VM-specific firewall rules and transmitting 508 the VM-specific firewall rules to a firewall, wherein each VM-specific firewall rule is configured for application by the firewall to communication requests identifying an IP address of one of the VMs.

Figure 6:
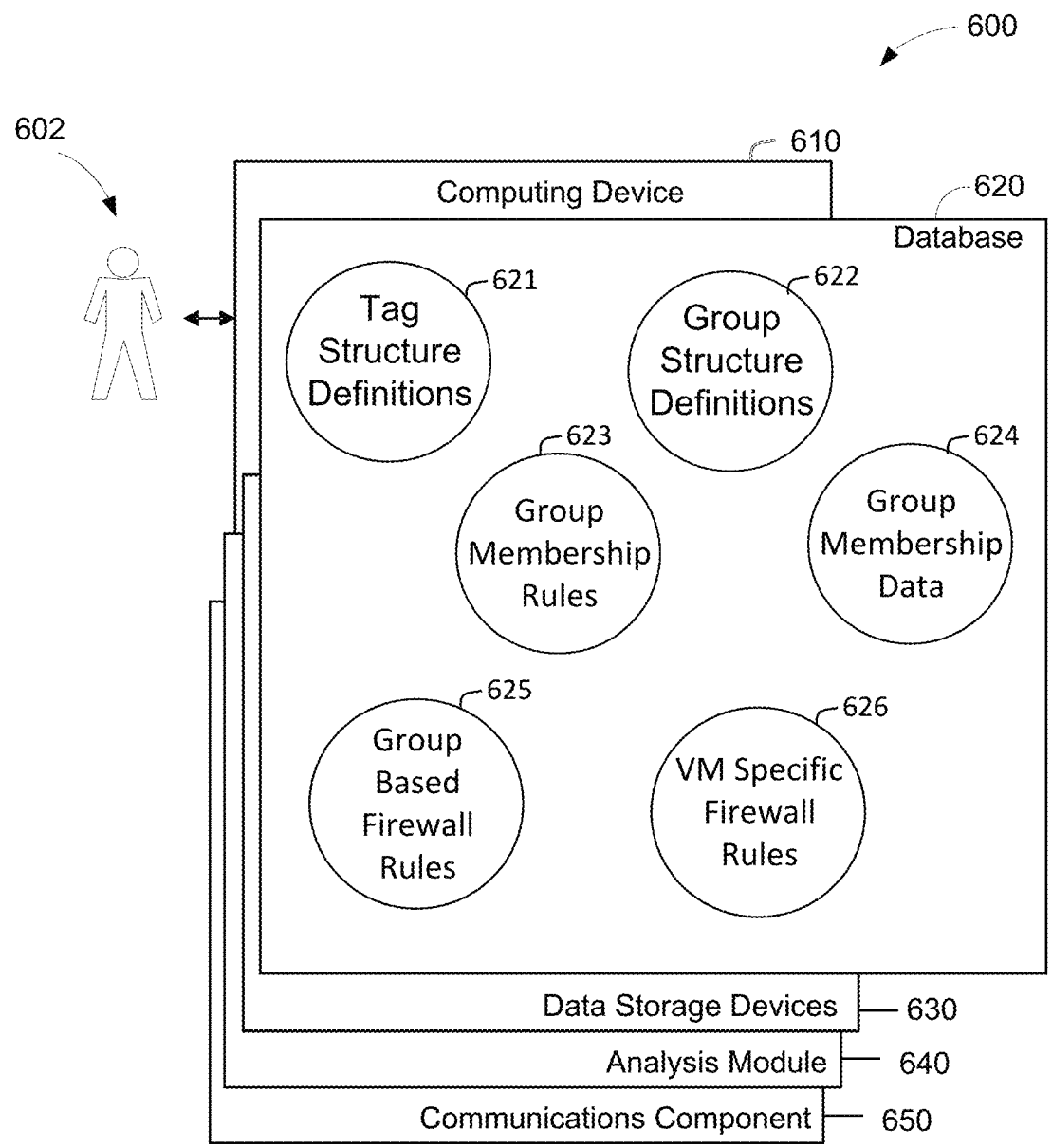

FIG. 6 depicts a diagram 600 of components of one or more example computing devices 610 that may be used to implement firewall configuration server 104 (shown in FIG. 1). In some embodiments, computing device 610 may be similar to firewall configuration server 104. Database 620 may be coupled with several separate components within computing device 610, which perform specific tasks. In this embodiment, database 620 may include tag structure definitions 621, group structure definitions 622, group membership rules 623, group membership data 624, group-based firewall rules 625, and VM-specific firewall rules 626. In some embodiments, database 620 is similar to security database 110 (shown in FIG. 1).

Computing device 610 may include the database 620, as well as data storage devices 630, which may be used, for example, for storing any system data locally. Computing device 610 may also include analysis module 640 and communications component 650, which may be used in combination, for example, to receive 502 group-based firewall rules, receive 904 group membership data, parse 506 the group membership data, and transmit 508 VM-specific firewall rules (all shown in FIG. 5). Communications component 650 may be used to enable communication between any components of computing device 610 as well as between computing device 610 and external computing devices, such as VM server system 102, admin computer device 108, security database 110, user computer devices 128, and firewall 106.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for various aspects of fraud analysis for registration of merchants with acquirer banks. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the firewall configuration server and VM server system are described herein as including general processing and memory devices, it should be understood that the firewall configuration server and VM server system are specialized computers configured to perform the steps described herein for configuring firewall rules.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A firewall configuration server including at least one processor in communication with at least one memory device, wherein the at least one processor is configured to:
   receive, from an admin computer device, group-based firewall rules, wherein the group-based firewall rules identify a plurality of groups of virtual machines (VMs) executable on a VM server system and a respective set of firewall policies to be applied to the VMs in each group, and wherein the group-based firewall rules contain no data that identifies a specific VM;
   receive, from a virtual machine (VM) server system including a hypervisor, group membership data, the group membership data identifying the plurality of groups and a respective list of VMs associated with each group and currently resident on the VM server system, wherein the group membership data includes a new VM, and wherein the group membership data is received at the at least one processor i) after the hypervisor initiates a build of the new VM but ii) prior to the hypervisor completing the build of the new VM;
   parse the group membership data according to the group-based firewall rules to generate VM-specific firewall rules; and
   transmit the VM-specific firewall rules to a firewall, wherein each VM-specific firewall rule is configured for application by the firewall to communication requests identifying an IP address of one of the VMs.

2. The firewall configuration server according to claim 1, wherein the group-based firewall rules are received before at least one of the VMs identified in the group membership data is built on the VM server.

3. The firewall configuration server according to claim 1, wherein to receive the group membership data, the at least one processor is further configured to poll the VM server system on a periodic basis, and retrieve the group membership data.

4. The firewall configuration server according to claim 3, wherein the VM server system executes the hypervisor to manage the VMs, and wherein the at least one processor is further configured to execute a module that polls the hypervisor directly for the group membership data.

5. The firewall configuration server according to claim 3, wherein the at least one processor is further configured to:
   re-generate the VM-specific firewall rules in response to each receipt of the group membership data on the periodic basis; and
   transmit the re-generated VM-specific firewall rules to the firewall automatically in response to each regeneration of the VM-specific firewall rules.

6. The firewall configuration server according to claim 3, wherein the periodic basis is such that a time lapse between a build of a new VM at the VM server system, and recognition of the new VM in one of the groups by the firewall configuration server, does not exceed 60 seconds.

7. The firewall configuration server according to claim 1, wherein the at least one processor is further configured to receive the group-based firewall rules indirectly from the admin computer device by retrieving the group-based firewall rules from a database in communication with the admin computer device.

8. A computer-implemented method for managing firewall rules, the method implemented by a computer system including at least one processor, the method comprising:
   receiving, from an admin computer device, group-based firewall rules, wherein the group-based firewall rules identify a plurality of groups of virtual machines (VMs) executable on a VM server system and a respective set of firewall policies to be applied to the VMs in each group, and wherein the group-based firewall rules contain no data that identifies a specific VM;
   receiving, from a virtual machine (VM) server system including a hypervisor, group membership data, the group membership data identifying the plurality of groups and a respective list of VMs associated with each group and currently resident on the VM server system, wherein the group membership data includes a new VM, and wherein the group membership data is received at the at least one processor i) after the hypervisor initiates a build of the new VM but ii) prior to the hypervisor completing the build of the new VM;
   parsing the group membership data according to the group-based firewall rules to generate VM-specific firewall rules; and
   transmitting the VM-specific firewall rules to a firewall, wherein each VM-specific firewall rule is configured for application by the firewall to communication requests identifying an IP address of one of the VMs.

9. The method according to claim 8, wherein the group-based firewall rules are received before at least one of the VMs identified in the group membership data is built on the VM server.

10. The method according to claim 8, wherein receiving the group membership data further comprises polling the VM server system on a periodic basis, and retrieving the group membership data.

11. The method according to claim 10, wherein the VM server system executes the hypervisor to manage the VMs, the method further comprising executing a module that polls the hypervisor directly for the group membership data.

12. The method according to claim 10, further comprising:
   re-generating the VM-specific firewall rules in response to each receipt of the group membership data on the periodic basis; and
   transmitting the re-generated VM-specific firewall rules to the firewall automatically in response to each regeneration of the VM-specific firewall rules.

13. The method according to claim 10, wherein the periodic basis is such that a time lapse between a build of a new VM at the VM server system, and recognition of the new VM in one of the groups by the firewall configuration server, does not exceed 60 seconds.

14. The method according to claim 8, wherein receiving the group-based firewall rules comprises receiving the group-based firewall rules indirectly from the admin computer device by retrieving the group-based firewall rules from a database in communication with the admin computer device.

15. At least one non-transitory computer-readable storage media having computer-executable instructions embodied thereon for managing firewall rules, wherein when executed by at least one processor of a firewall configuration server, the computer-executable instructions cause the processor to:
receive, from an admin computer device including a hypervisor, group-based firewall rules, wherein the group-based firewall rules identify a plurality of groups of virtual machines (VMs) executable on a VM server system and a respective set of firewall policies to be applied to the VMs in each group, and wherein the group-based firewall rules contain no data that identifies a specific VM, wherein the group membership data includes a new VM, and wherein the group membership data is received at the at least one processor i) after the hypervisor initiates a build of the new VM but ii) prior to the hypervisor completing the build of the new VM;
receive, from a virtual machine (VM) server system, group membership data, the group membership data identifying the plurality of groups and a respective list of VMs associated with each group and currently resident on the VM server system;
parse the group membership data according to the group-based firewall rules to generate VM-specific firewall rules; and
transmit the VM-specific firewall rules to a firewall, wherein each VM-specific firewall rule is configured for application by the firewall to communication requests identifying an IP address of one of the VMs.

16. The at least one non-transitory computer-readable storage media according to claim 15, wherein the group-based firewall rules are received before at least one of the VMs identified in the group membership data is built on the VM server.

17. The at least one non-transitory computer-readable storage media according to claim 15, wherein the computer-executable instructions further cause the processor to receive the group membership data by polling the VM server system on a periodic basis, and retrieving the group membership data.

18. The at least one non-transitory computer-readable storage media according to claim 17, wherein the VM server system executes the hypervisor to manage the VMs, and wherein the computer-executable instructions further cause the processor to execute a module that polls the hypervisor directly for the group membership data.

19. The at least one non-transitory computer-readable storage media according to claim 17, wherein the computer-executable instructions further cause the processor to:
re-generate the VM-specific firewall rules in response to each receipt of the group membership data on the periodic basis; and
transmit the re-generated VM-specific firewall rules to the firewall automatically in response to each regeneration of the VM-specific firewall rules.

20. The at least one non-transitory computer-readable storage media according to claim 17, wherein the periodic basis is such that a time lapse between a build of a new VM at the VM server system, and recognition of the new VM in one of the groups by the firewall configuration server, does not exceed 60 seconds.

* * * * *